(12) United States Patent
Grochowski (10) Patent No.: US 8,192,706 B2
(45) Date of Patent: Jun. 5, 2012

(54) METHOD AND DEVICE FOR PURIFYING THE FLUE GASES OF A SINTERING PROCESS OF ORES AND/OR OTHER MATERIAL-CONTAINING MATERIALS IN METAL PRODUCTION

(75) Inventor: Horst Grochowski, Oberhausen (DE)

(73) Assignee: Horst Grochowski (DE)

( * ) Notice: Subject to any disclaimer, the term of this patent is extended or adjusted under 35 U.S.C. 154(b) by 4 days.

(21) Appl. No.: 12/518,837

(22) PCT Filed: Dec. 14, 2007

(86) PCT No.: PCT/EP2007/011048
§ 371 (c)(1),
(2), (4) Date: Aug. 5, 2010

(87) PCT Pub. No.: WO2008/071446
PCT Pub. Date: Jun. 19, 2008

(65) Prior Publication Data
US 2010/0296991 A1    Nov. 25, 2010

(30) Foreign Application Priority Data
Dec. 14, 2006  (WO) ................ PCT/EP2006/012062

(51) Int. Cl.
*B01D 53/46* (2006.01)
*B01D 53/74* (2006.01)
(52) U.S. Cl. ............... 423/210; 423/239.1; 423/244.01; 423/240 S; 423/245.1; 423/215.5; 422/168; 422/169; 422/170; 422/171; 422/172; 422/177
(58) Field of Classification Search .................. 423/210, 423/239.1, 244.01, 240 S, 245.1, 215.5; 422/168–172, 177
See application file for complete search history.

(56) References Cited

U.S. PATENT DOCUMENTS
4,500,501 A    2/1985    Hamada et al.
(Continued)

FOREIGN PATENT DOCUMENTS
DE          3916325          11/1990
(Continued)

OTHER PUBLICATIONS

Tsuji K. et al., Combined desulfurization denitrification and reduction of air toxics sing activated coke—2. Process applications and performance of activated coke. Fuel IPC Science & Technology Press, Guilford, GB, May 1997.

(Continued)

*Primary Examiner* — Timothy Vanoy
(74) *Attorney, Agent, or Firm* — Fay Sharpe LLP; Brian E. Turung (57) ABSTRACT

A method for purifying waste gases of an at least partially burnt solid fuel to reduce pollutants such as $SO_x$ and/or HCl and $NO_x$. The waste gas flows into a moving bed reactor from below through a lower and upper layer of an adsorption and/or absorption agent already polluted with $NO_x$, $SO_x$ and/or HCl. $SO_x$ and/or HCl components are adsorbed from the waste gas into the $NO_x$ loaded adsorption and/or absorption agent. Thereafter, the waste gas is mixed with an ammonium-containing compound and flows through an upper horizontal gas inflow and bulk material removal tray of the moving bed reactor into the upper layer of the adsorption and/or absorption agent already polluted with $NO_x$ and small quantities of $SO_x$ and/or HCl. During the throughflow of the upper layer, $NO_x$ components are adsorbed from the waste gas onto the adsorption/absorption agent.

21 Claims, 5 Drawing Sheets

U.S. PATENT DOCUMENTS

2011/0268638 A1* 11/2011 Kato et al. ............ 423/239.1

FOREIGN PATENT DOCUMENTS

| EP | 202411 | 11/1986 |
|---|---|---|
| EP | 0301272 | 2/1989 |
| JP | 60061024 | 4/1985 |
| JP | 2000102719 | 4/2000 |
| WO | WO 88/08746 | 11/1988 |
| WO | WO 90/14156 | 11/1990 |
| WO | WO 01/17663 | 3/2001 |
| WO | WO 2006084671 | 8/2006 |

OTHER PUBLICATIONS

E. Richter et al. Mechanisms and kinetics of SO2 adsorption and NOx reduction on active coke Gas separation and purification. 1987.
D. Olson et al. The reduction of gas phase air toxics from combustion and incineration sources using the Met-Mitsui-BF activated coke process. Fuel processing Technology. 2000.
International Search Report dated Apr. 16, 2008.

* cited by examiner

METHOD AND DEVICE FOR PURIFYING THE FLUE GASES OF A SINTERING PROCESS OF ORES AND/OR OTHER MATERIAL-CONTAINING MATERIALS IN METAL PRODUCTION

TECHNICAL FIELD

The invention concerns a method for the cleaning of the waste gases of a sintering process from ores in the production of metal, and an apparatus to carry out the method:

TECHNICAL BACKGROUND

In the sintering of ore material, the material is mixed with a small-particle carbon-containing solid and placed on a sintering belt, and with at least partial combustion of the solid during the ongoing transport on the sintering belt, the material is transported to a discharge end. Alternatively, the starting material is pelletted or briquetted and subsequently sintered. Combustion air is supplied. During the sintering process, the charging stock passes through a smoldering and, at least partially, a combustion process, by means of which the starting material is agglomerated—that is, sintered—to form larger pieces. Due to the combustion and smoldering process increased by supplied combustion air, considerable gas quantities are released from the charging stock; they contain a whole series of pollutants in addition to the components $CO_2$, perhaps $CO$, $O_2$, $H_2O$, and/or $N_2$. In particular, they are nitrogen oxides ($NO_x$), $SO_2$, HCl, dioxins, furans, dusts, and sublimatable or condensable residues from the smoldering process, heavy hydrocarbons, and/or heavy metals.

Studies on air maintenance have shown that the waste gases, for example, from sintering belts, contain a very considerable fraction of the total impurities, which are, as a whole, yielded during the production of metal. Thus, in the area of dioxins and furans, contamination fractions of more than 90% of the corresponding emissions were detected in the production of iron and steel. Due to the extraordinarily large waste gas quantities in sintering belt plants, satisfactory gas purification has been possible, up to now, only at very considerable expense, which appreciably increases the cost of steel production as a whole. In particular, as a result of the different fractions of the pollutants in the sintering belt waste gas and its greatly fluctuating composition, which depends on the charging stock, and also because of the very different reactions of the pollutants and the purification methods which are available, it has been necessary to implement a large number of purification steps one after the other.

Thus, for example, so-called airborne flow methods, with downstream filtering-out of the airborne flow particles, and further downstream, catalytic oxidation for dioxin reduction, have been proposed. With these methods, considerable catalyst damage appeared which, in particular, shows up as a surface coating of the catalyst with organic hydrocarbons (Final Report 50 441-5/217, "Reduction of dioxin emissions from sintering plants," commissioned by the German Federal Environmental Agency, December 2002).

Another waste gas purification method for sintering belt plants has been proposed in WO 01/17663—in such a way that the sintering belt waste gas was purified in an airborne flow-purification stage, with a subsequent adsorption purification stage, wherein in the airborne flow-purification stage, high-value active coke in ground form—that is, with a relatively small particle size—was delivered to the waste gas, in the form of an airborne flow cloud. The finely divided adsorption agent reacts, in the airborne flow phase, with a part of the pollutants to be removed from the sintering belt waste gas. As a post-reaction stage for the airborne flow process, the flying dust was not precipitated, on a cloth filter or an electrofilter however, but rather on the entry side of the counterflow moving bed reactor where the flying dust was precipitated on the particles of the moving bed bulk material—that is, on their surfaces or in the volume between particles. Subsequently, the sintering belt waste gas flowed through the particle layer of the counterflow moving bed reactor, from, for example, active coke, so that the sintering belt waste gas, previously purified in the airborne flow phase, then undergoes an adsorption purification. The airborne flow-purification process, downstream from the moving bed reactor, requires the use of a second particle-shaped purification agent without, in this way, the detrimental catalyst damage in the moving bed already being stopped.

Above all, when removal of the $NO_x$ from the sintering waste gas is most important, other pollutants such as $SO_2$ and HCl have proved to be particularly disturbing if the $NO_x$ is to be removed from the waste gas with the aid of a catalyst, then these and other pollutants contained in the sintering waste gas are so-called catalyst toxins for the removal of the $NO_x$.

In WO 2006/084671 A1, therefore, a preliminary purification stage for the most extensive removal of, above all, $SO_x$ and HCl, and a post-purification stage, a counterflow reactor traversed from above downwards by a catalyst for the deposition of $NO_x$ such as a carbon-containing, absorption agent, were used. Here, in a single adsorption and/or absorption middle layer, a two-stage waste gas purification process was carried out in which the first stage was carried out in the entry area, and the second purification stage in the subsequent zones of the adsorption and/or absorption middle layer. It had become evident, namely, that a preliminary purification stage, in which, for example, the $SO_2$ is deposited with calcium hydroxide, was also insufficient, because the residual quantity of $SO_2$ and/or HCl remaining in the waste gas—if it does not come into contact with ammonia, which is required for the $NO_x$ conversion—leads to a situation where the catalyst grains of the $NO_x$ catalyst, if it is a carbon-containing absorption and/or adsorption agent, such as active coke, can swell thereby (popcorn formation). This effect occurs if ammonium sulfate or ammonium chloride crystals form in the porous catalyst. The expansion of the forming crystals in the pore system breaks the structure of the catalyst. The catalyst, therefore, is not only consumed but also disintegrates. Particle size diminutions in the catalyst bed lead, moreover, to a rise in the pressure loss and, consequently, to another increase in the costs of the purification process. Since, in accordance with WO 2006/084671 A1—the thus damaged catalyst of the lower purification stage of the single reactor bed was, again and again, discharged on the lower tray from the single reactor bed, a sufficient total purification of the sintering belt waste gas was attained. For the preliminary purification of the sintering waste gas before its entry into the moving bed reactor unit, a bag filter or an electrofilter and/or a waste gas scrubber was preferably used. Alternatively or supplementarily, finely distributed reaction and/or absorption agent, such as lime dust and/or active coke dust, could be added to the sintering waste gas in the airborne flow, in order to free the sintering waste gas from at least a part of the pollutants $SO_2$ and HCl before entering into the moving bed reactor plant. Preferably, the previously purified sintering waste gas contained, upon entry into the moving bed reactor plant, an $SO_2$ content of less than 100 mg per standard cubic meter, preferably, no more than 5 mg per standard cubic meter.

What these known preliminary purification stages have in common is that a considerable equipment outlay must be made for this, and additional consumable material, such as lime, must be used and subsequently disposed of or further processed. Moreover, in the case of wet scrubbing methods, corrosion problems, reheating problems, and/or water workup problems have to be overcome.

SUMMARY OF THE INVENTION

Proceeding from this, the goal of the invention is to avoid, during the purification of sintering waste gases, in particular, $SO_x$ and/or HCL and also $NO_x$, the use of another preliminary purification stage using consumable material. To attain this goal, a method and an apparatus are proposed.

Accordingly, the invention provides, initially, for the sintering waste gas, perhaps after a preliminary dedusting stage, to flow into a moving bed reactor from below through a lower, horizontal incoming gas flow and bulk material removal tray of the moving bed reactor into a lower layer of adsorption and/or absorption agents, already polluted with $NO_x$ or $N_2$ and perhaps water vapor and $SO_x$ and/or HCl and perhaps of other pollutants, and during the throughflow of the lower adsorption and/or absorption agent layer, to allow at least the main quantity of $SO_x$ and/or HCl components and perhaps of other pollutants to be absorbed from the sintering waste gas into the pore system of the adsorption and/or absorption agent loaded with $NO_x$ or $N_2$. The sintering waste gas, purified of the main quantity of $SO_x$ and perhaps of other pollutants, leaves the lower adsorption and/or absorption agent layer on its upper free surface, so as to subsequently be intimately mixed with an ammonium-containing compound, such as ammonia or urea, for the conversion of the $NO_x$ into, for example, $N_2$ and water vapor. The sintering waste gas, mixed with the ammonium-containing compound and purified of the main quantity of $SO_x$ and/or HCl components, flows from below through an upper horizontal gas inflow and bulk material removal tray of the same moving bed reactor into an upper layer of the adsorption and/or absorption agent already polluted with $NO_x$ or $N_2$ and small quantities of $SO_x$ and perhaps of other pollutants. During the throughflow of the upper adsorption and/or absorption agent layer, adsorption of at least the main quantity of $NO_x$ components from the sintering waste gas and the at least one ammonium-containing compound takes place on the surface of the adsorption and/or absorption agent of the upper layer, loaded with $NO_x$ or $N_2$ and small quantities of $SO_x$ and perhaps of other pollutants. The sintering waste gas, purified of the main quantity of $SO_x$ and perhaps of other pollutants and $NO_x$ components, leaves the upper adsorption and/or absorption agent layer, on its upper free surface, so as to subsequently leave the process. Fresh and/or regenerated adsorption and/or absorption agent is supplied from above and uniformly distributed, over a bulk material distribution tray, on the upper end of the moving bed reactor, on the upper free surface of the upper layer of the adsorption and/or absorption agent. The adsorption and/or absorption agent migrates—without interruption by blocking elements in the area of the upper gas inflow and bulk material removal tray—through the upper and lower layer of the entire moving bed reactor, gradually and completely, from above downwards, and is thereby successively loaded, initially with $NO_x$ or $N_2$ and water vapor, on its surface, and then with $SO_x$ and perhaps of other pollutants in its pore system. Afterwards, it migrates through the lower gas inflow and bulk material removal tray of the moving bed reactor. The subsequent guidance, removal, and the migration rate of the adsorption agent and/or the absorption agent preferably takes place intermittently (or continuously), via bulk material discharge elements, below or on the lower gas inflow and bulk material removal tray. The loading quantity of the adsorption and/or absorption agent in the upper layer of the moving bed reactor with $SO_x$ and perhaps of other pollutants is adjusted to a pre-specifiable quantitative fraction, relative to the loaded adsorption and/or absorption agent, by the corresponding actuation of the bulk material discharge elements below or on the lower gas inflow and bulk material tray.

By means of the invention, a considerable simplification of the method is attained with, simultaneously, up to 100% utilization of the adsorption/absorption capacity of the used adsorption/absorption agent, with an entirely sufficient degree of deposition on $NO_x$ and $SO_x$ and/or HCl and perhaps of other pollutants in a single two-stage counterflow moving bed reactor. Also, the dust quantities still present in the sintering waste gas, after the preliminary purification, and flowing toward the moving bed reactor, are also removed to a sufficient extent. This efficiency is surprising in view of the fact that older adsorptive methods for the simultaneous removal of $SO_x$ and $NO_x$ from carbon-power plant waste gases require approximately twice as much adsorption agent circulation, although power plant waste gases contain a quantity of accompanying pollutants which is clearly lower than the quantity in sintering belt waste gases because of the high burning of the carbon used. What is also surprising is the aforementioned efficiency of the method of the invention in comparison to the process described in WO 2006/084671A1 for the removal of the $SO_x$ in a preliminary purification stage. With this known method, several tons of lime per day must be circulated in the preliminary purification stage. In contrast to this, the invention attains a comparable high degree of $SO_x$ removal from the waste gas, although the deposition of the $SO_x$ on the adsorption/absorption agent, already preloaded with $NO_x$ and other pollutants, takes place in the presence of an ammonium-containing compound. Nevertheless, the conducting of the process is comparatively simple and disturbances during the migration process of the adsorption/absorption agent through the two-stage moving bed reactor are avoided. The removal of consumed adsorption/absorption agent and the replenishing of fresh adsorption/absorption agent is merely controlled via bulk material removal elements, which are found below on the moving bed reactor—to the extent that the loading of the upper adsorption/absorption agent layer is limited to a specific $SO_x$ and/or HCl quantity.

If the load value of the adsorption agent and/or absorption agent of the moving bed reactor in the upper layer with $SO_x$ and/or HCl is limited to a maximum value of 10 wt %, preferably, to a maximum of 6 wt %, relative to the weight of the adsorption/absorption agent removed from the bulk material discharge elements, a particularly high $NO_x$ deposition from the sintering waste gas takes place without damage to the adsorption/absorption agent hindering the $SO_x$ and/or HCl removal in the lower adsorption and/or absorption agent layer of the moving bed reactor. This limitation takes place in that the migration through the gas inflow and bulk material removal tray from the lower end of the moving bed reactor is controlled with regard to the bulk material removal elements.

If a carbon-containing adsorption/absorption agent is used, particularly high degrees of deposition from the sintering waste gas of pollutants to be removed, are attained. If the adsorption and/or absorption agent is an active coke, a favorable wear resistance of the adsorption/absorption agent is attained in this manner on its way through the two-stage moving bed reactor, with its two inflow and removal trays and the removal elements. If a shaped active coke is used, favorable flow ratios and a lower pressure loss in the two adsorption/absorption agent layers are attained in this way. The particle sizes of the carbon-containing adsorption/absorption agent can basically vary widely. Preferably, however, excessively large particles and so-called undersized material in the form of dust and fragments are to be avoided if possible. Particle sizes between 1 and 10 mm are especially favorable. A narrow range, preferably, between 3 and 8 mm, however, is preferred. For the $NO_x$ removal and the removal of $SO_x$ and/or HCl on the same adsorption/absorption agent, particle sizes between 4 and 6 mm, preferably, on the order of magnitude of 5 mm, have proved to be particularly effective.

Whereas the adsorption/absorption agent can be completely discarded, in particular, burned on the sintering belt, after passage through the moving bed reactor, high-value, carbon-containing adsorption/absorption agents proved to be particularly advantageous, because in spite of the particularly high pollutant load with the invention, it can be used, renewed, after a regeneration step. If a so-called pre-activator, which is supplied from the above mixed with already regenerated active coke to the moving bed reactor, is used as a fresh adsorption/absorption agent, then lower demands can be made on the activity of the adsorption/absorption agent in the fresh state, because in a sequence of several circulations of the active coke with individual desorption and regeneration, a sufficiently high end activity is attained after every circulation through the moving bed reactor.

The regeneration preferably takes place in that the regeneration step occurs in a 3-stage process in which the active coke, loaded with pollutant from the moving bed reactor is guided in a vertically extended regeneration unit from above through an indirectly heated desorber, such as a tubular desorber, initially, and subsequently, from above through a post-degassing zone with the suctioning of desorbed polluting gas, and, finally, is conducted from above through an indirectly cooled cooler. In this form, it has an independent inventive importance and can be constructed in more detail as desired in accordance with the individual measures described in an embodiment example of FIG. 1A.

The method in accordance with the invention can be used as a completely dry gas purification method, so that problems with wet scrubbers and the like, and heating problems, are eliminated. The gas temperatures in the moving bed reactor, which preferably are above 80° C. and, favorably, in a temperature range of 80° C. to 180° C., permit considerable flexibility in conducting the process, wherein gas temperatures between 50° C. and 150° C., preferably, between 130° C. and 150° C., produce particularly favorable gas purification values.

The height of the upper and lower adsorption agent layer in the moving bed reactor is extremely uniform in above the reactor cross-section if a gas inflow/bulk material removal tray, in accordance with WO 88/08746A1, is used. Basically, the layer height in a moving bed reactor can also still be changed subsequently, whereby that the bulk material allotting tubes above the individual layer can be lengthened or shortened in favor of or at the expense of the size of the gas removal space. Usually, however, fixed layer heights are selected. They are between 1.5 m and 4.5 m, preferably, between 2.5 m and 3.5 m, and with particular preference, approximately 3 m, in the upper layer in the invention under consideration. The height of the lower layer is preferably somewhat smaller and is on the order of magnitude between 0.5 m and 3 m, preferably, between 1.5 m and 2 m, and especially preferably is approximately 1.75 m. These layer heights and the layer height differences (between the upper and lower layer) permit a simple conducting of the process, even with changing gas compositions of the sintering waste gas.

An ammonium-containing compound for the conversion of $NO_x$ and the adsorption onto a bulk material is preferably produced whereby an additional heated mixture of an ammonium-containing solution and air is atomized in an evaporator with the formation of an air/$H_2O$-vapor/$NH_3$ gas mixture, to a mixture of an ammonium-containing solution, such as an $NH_4OH$ solution and compressed air. An air/$H_2O$-vapor/$NH_3$ gas mixture has an independent inventive importance in this form and can be carried out in more detail as desired, in accordance with the individual measures described in the example embodiment of FIG. 1A.

"Adsorption," in the sense of the invention, is understood to be a process in which one or more components is/are directly adsorbed from the waste gas. "Absorption," in the sense of the invention, is understood to be a process wherein substances coming from the waste gas to be purified initially undergo a chemical reaction and only subsequently are adsorbed. As the adsorption and/or absorption agent, depending on the composition of the sintering waste gas, for example, active coke (doped or undoped), or mixtures of carbon-containing, doped or undoped absorption and/or absorption agents, in particular, active coke and a reaction agent for acidic pollutants, such as lime, are preferred.

Independent of the used adsorption and/or absorption agent, the method can take place in various modes of operation:

On the one hand, by way of the one-time passage—that is, for adsorption and/or absorption agents to pass one single time through a moving bed reactor by the stepwise removal on the lower reactor end and the stepwise replenishing at the upper end, in the individual bulk material layers, and subsequently, not to be used again in the process. This procedure is recommended with adsorption and/or absorption agents with a very small stoichiometry factor and/or low solid loads of the fluids to be purified, in particular, with low dust loads.

If the solid, and in particular dust, loads of the fluid are comparatively high and/or if the stoichiometry factor is less favorable, then several circulations of the adsorption and/or absorption agent can be carried out through the moving bed reactor. After each circulation, the adsorption and/or absorption agent can then be subjected to a treatment for further use. This treatment can be, for example: screens, as with a vibrating screen, with a subsequent or simultaneous air classification for the purpose of eroding, underside material deposition and/or dust deposition of the dust adhering to the adsorption and/or absorption particles or regeneration or doping for the freshening up or improvement of the catalytic properties. In both usage cases (simple or multiple use), high total residence times of the adsorption and/or absorption agent in the reactor can be implemented, wherein with a one-time passage, the residence time in the reaction process is particularly long—that is, the migration rate of the adsorption and/or absorption agent is relatively low—from the entry to the exit. A higher migration rate of the adsorption and/or absorption agent through the reactor is, as a rule, required, for example, with high solids fractions of the fluid to be purified.

By means of the invention, it is now also possible to utilize the advantages of relatively smaller—that is, economically more favorable—stoichiometry factors of a sorption agent in a preliminary purification stage, without having to "buy" this advantage with a relative high consumption of the adsorption and/or the absorption agent. This is attained in that a substance from the group of calcium oxide, calcium hydroxide, sodium bicarbonate, and/or the similar alkali or alkaline-earth compounds for the binding of a partial quantity of the $SO_x$, HS, and/or HCl contained in the sintering waste gas is added to the sintering waste gas in a preliminary purification stage, in particular, before a bag filter. The preferred added quantity corresponds to a stoichiometric factor between 1.0 and 2.5, preferably, between 1.5 and 2.0. The partial quantity of the $SO_x$, HS, and/or HCl preferably removed during the preliminary stage, corresponds to a portion between 10% and 90%, preferably, between 50% and 80%, and with particular preference, between 65% and 75% of the $SO_x$, HS, and/or HCl, contained in the sintering waste gas. In this way, the consumption of this substance in the preliminary purification stage, which is also used as a filter for dust loads and other pollutants in the sintering waste gas, is kept relatively low, and consumption of the comparatively expensive adsorption and/or absorption agent is lowered appreciably.

The previously mentioned and claimed components to be used in accordance with the invention, as described in the embodiment examples, are not subject to any special exceptional conditions, with regard to size, shape, material selection, or technical conception, so that the selection criteria known in the field can be used without restriction.

Other details, features, and advantages of the subject of the invention result from the subclaims, and from the following description of the pertinent drawing and table, in which, by way of example, an embodiment example of a sintering belt purification is depicted.

In summary, there is provided a method for the purification of waste gases that are produced from a sintering process of ores or of metal-containing wastes, such as from recycling processes, in the production of metals. The ore material, perhaps together with other metal-containing materials or metal-containing wastes, is sintered together with an at least partial solid fuel under at least partial burning of the solids and while passing through a smoldering process. The sintering waste gas contains, in addition to the components of $CO_2$, CO, $O_2$, $H_2O$, and/or $N_2$, at least some of the following pollutants: $NO_x$, $SO_2$, HCl, HS, Hg, dioxins, furans, dusts, and sublimatable or condensable residues from the smoldering process, heavy hydrocarbons, and/or heavy metals. The sintering waste gas, perhaps after a pre-dedusting stage, flows into a moving bed reactor from below through a lower horizontal gas inflow and bulk material removal tray of the moving bed reactor, into a lower layer of adsorption and/or absorption agent already polluted with $NO_x$ and $SO_x$ and/or other pollutants, and with the throughflow of the lower adsorption agent and/or absorption agent layer, adsorbs at least the main quantity of $SO_x$ and perhaps of others of the pollutants from the sintering waste gas in the pore system of the adsorption an/or absorption agent, loaded with $NO_x$ and/or $N_2$. The sintering waste gas, purified of the main quantity of $SO_x$ and perhaps of other pollutants, leaves the lower adsorption and/or absorption agent layer on its upper free surface, so as to be intimately mixed subsequently for the conversion of the $NO_x$, for example, into $N_2$ and water vapor, with an ammonium-containing compounds, such as ammonia or urea. The sintering waste gas, mixed with the ammonium-containing compound and purified of the main quantity of $SO_x$ and perhaps pollutants, enters from below through an upper horizontal gas inflow and bulk material removal tray of the moving bed reactor, an upper layer of adsorption and/or absorption agent already polluted with $NO_x$ and/or $N_2$ and perhaps small quantities of $SO_x$ and perhaps of other pollutants and, with the throughflow of the upper adsorption and/or absorption agent layer, adsorbs at least the main quantity of $NO_x$ components from the sintering waste gas and/or their reaction products, on the surface of the adsorption and/or absorption agent, loaded with $NO_x$ and/or $N_2$ and perhaps small quantities of $SO_x$ and perhaps of other pollutants. The sintering waste gas, purified of the main quantity of $SO_x$ and perhaps of other pollutants and $NO_x$ components leaves the upper adsorption and/or absorption agent layer on its upper free surface, so as to subsequently leave the process. Fresh and/or regenerated adsorption and/or absorption agent is supplied to the upper free surface of the upper layer of the adsorption and/or absorption agent, uniformly distributed from above via a bulk material-distributing tray, on the upper end of the moving bed reactor and without interruption by blocking elements in the area of the upper gas inflow and bulk material removal tray, subsequently migrates completely through the upper and lower layers of the entire moving bed reactor, gradually, from above downwards, and thereby successively, is initially loaded with NO or $N_2$ and water vapor on its surface, and subsequently with $SO_x$ and perhaps of other pollutants in its pore system, and subsequently migrates through the lower gas inflow and bulk material removal tray of the moving bed reactor. The subsequent conducting, removal, and the migration rate of the adsorption agent and/or the absorption agent takes place via bulk material discharge elements, below or on the lower gas inflow and bulk material removal tray. The loading quantity of the adsorption and/or absorption agent in the upper layer of the moving bed reactor with $SO_x$ and perhaps of other pollutants is adjusted to a pre-specifiable quantity fraction, relative to the loaded adsorption and/or absorption agent, by the corresponding actuation of the bulk material discharge elements, below or on the lower gas inflow and bulk material removal tray. In one additional or alternative embodiment of the invention, the loading value of the adsorption and/or absorption agent of the moving bed reactor in the upper layer with $SO_x$ and perhaps of other pollutants is limited to a maximum 10 wt %, preferably, to a maximum 6 wt %, relative to the weight of the adsorption and/or absorption agent, removed on the bulk material discharge elements. In another additional or alternative embodiment of the invention, a carbon-containing adsorption and/or absorption agent is used as the adsorption and/or absorption agent. In another additional or alternative embodiment of the invention, the carbon-containing adsorption and/or absorption agent is an active coke, in particular, one that is shaped. In another additional or alternative embodiment of the invention, the carbon-containing adsorption and/or absorption agent has a particle size of predominantly 1 mm to 10 mm, preferably, 3 mm to 8 mm, and with particular preference, 4 mm to 6 mm. In another additional or alternative embodiment of the invention, the consumed or partially consumed adsorption and/or absorption agent, removed below from the moving bed reactor, is extensively freed in one regeneration step, from the adsorbed and/or absorbed pollutants and at least partially is delivered once again above to the moving bed reactor as the adsorption and/or absorption agent alone or mixed with freshly used, carbon-containing adsorption and/ or absorption agent. In another additional or alternative embodiment of the invention, as the freshly used, carbon-containing adsorption and/or absorption agent, a preactivator is used. In another additional or alternative embodiment of the invention, the gas purification takes place on the adsorption and/or absorption agent, at temperatures above 80° C., preferably in the temperature range of 80° C. to 180° C., and with particular preference, between 100° C. and 150° C. In another additional or alternative embodiment of the invention, the upper layer of the adsorption and/or absorption agent has, in the moving bed reactor, a height between 1.5 m and 4.5 m, preferably between 2.5 m and 3.5 m, and with particular preference, approximately 3 m. In another additional or alternative embodiment of the invention, the lower layer of the adsorption and/or absorption agent has, in the moving bed reactor, a height between 0.5 m and 3 m, preferably between 1.5 m and 2 m, and with particular preference, approximately 1.75 m. In another additional or alternative embodiment of the invention, an ammonium-containing compound is produced, for the $NO_x$ conversion and adsorption on a bulk material, from a mixture of an ammonium-containing solution, such as an $NH_4OH$ solution, and compressed air, the mixture of which is atomized into an evaporator, with an air/$H_2O$-vapor/$NH_3$ gas mixture, with the admixture of a another heated mixture of an ammonium-containing solution and air. In another additional or alternative embodiment of the invention, the regeneration step takes place in a 3-stage process in which the nitrogen-loaded active coke is initially guided from the moving bed reactor in a vertically extended regeneration unit, from above, through an indirectly heated desorber, such as a tubular desorber, and subsequently is conducted from above, through a post-degassing zone, with the suctioning of desorbed polluting gas, and finally, from above, through an indirectly cooled cooler. In another additional or alternative embodiment of the invention, a substance from the group of calcium oxide, calcium hydroxide, sodium bicarbonate, and/ or the same alkali or alkaline-earth compound for the binding of a partial quantity of the $SO_x$, HS, and/or HCl is added to the sintering waste gas in a preliminary purification step, in particular, before a bag filter. In another additional or alternative embodiment of the invention, the added quantity corresponds to a stoichiometry factor between 1.0 and 2.5, preferably, between 1.5 and 2.0. In another additional or alternative embodiment of the invention, the partial quantity of the $SO_x$, HS, and/or HCl removed in the preliminary purification stage corresponds to a fraction between 10% and 90%, preferably, between 50% and 80%, and with particular preference, between 65% and 75% of the $SO_x$, HS, and/or HCl contained in the sintering waste gas. In another additional or alternative embodiment of the invention, there is provided an apparatus for the purification of waste gases of a sintering process of ores or of metal-containing wastes, such as from a recycling process, in the production of metals, in which ore material, perhaps together with other metal-containing materials or metal-containing wastes, together with an at least partial solid fuel, is sintered with an at least partial combustion of the solids and with passage through a smoldering process. The sintering waste gas contains, in addition to the components $CO_2$, CO, $O_2$, $H_2O$ and/or $N_2$, at least some of the following pollutants: $NO_x$ $SO_2$, HCl, Hg, dioxins, furans, dusts, and sublimatable or condensable residues from the smoldering process, heavy hydrocarbons, and/or heavy metals, in particular, for carrying out the method as set forth above. The apparatus includes a moving bed reactor, filled with a lower and an upper adsorption agent and/or absorption agent layer, with a lower horizontal gas inflow and bulk material removal tray, through which the sintering waste gas can flow from below into a lower layer of an adsorption and/or absorption agent already polluted with $NO_x$ and/or $N_2$ and $SO_x$ and perhaps of other pollutants. The apparatus also includes a mixing element, subsequently inserted on the upper free surface of the lower adsorption and/or absorption agent layer, for the intimate mixing of the sintering waste gas, purified of the main quantity of $SO_x$ and perhaps of other pollutants, with an ammonium-containing compound, such as ammonia or urea. The apparatus also includes an upper, horizontal gas inflow and bulk material removal tray of the moving bed reactor, without blocking elements in the area of the upper gas inflow and bulk material removal tray, through which the sintering waste gas, mixed with the ammonium-containing compound and purified of the main quantity of $SO_x$ and perhaps of other pollutants can flow from below, into the upper layer of the adsorption and/or absorption agent already polluted with $NO_x$ or $N_2$ and small quantities of $SO_x$ and perhaps of other pollutants. The apparatus also includes an upper free surface of the upper adsorption and/or absorption agent layer from which the sintering waste gas, purified of the main quantity of $SO_x$ and perhaps of other pollutants and $NO_x$ components, can leave the adsorption and/or absorption layer, so as to subsequently leave the moving bed reactor. The apparatus also includes a bulk material-distributing tray on the upper end of the moving bed reactor that can be supplied by the fresh and/or regenerated adsorption and/or absorption agent, via the upper free surface of the upper layer of the adsorption agent and/or absorption agent, from above, and via this, can be uniformly distributed. The apparatus also includes bulk material discharge elements, on or below the lower gas inflow and bulk material removal tray, taking place by the subsequent conducting, removal, and the migration rate of the adsorption and/or absorption agent. The apparatus also includes control means of the bulk material discharge elements, by means of which the loading quantity of the adsorption and/or absorption agent in the upper layer of the moving bed reactor can be adjusted with $SO_x$ and perhaps of other pollutants to a pre-specifiable quantity fraction, relative to the loaded adsorption and/or absorption agent, by the corresponding actuation of the bulk material discharge elements, below or on the lower gas inflow and bulk material removal tray. In another additional or alternative embodiment of the invention, the mixing element for the intimate mixing of the sintering waste gas, purified of the main quantity of $SO_x$ and perhaps of other pollutants, with an ammonium-containing compound such as ammonia or urea, comprises a slit nozzle, which extends approximately horizontal over at least one wall side of the moving bed reactor. In another additional or alternative embodiment of the invention, an $NH_3$-addition unit, with which an ammonium-containing compound for the NO conversion and adsorption on a bulk material is produced, with a mixing site for an ammonium-containing solution, such as an $NH_4OH$ solution and compressed air, a heat exchanger for the heating of another mixture of an ammonium-containing solution and air, and with a nebulization nozzle for the admixing of the first mixture to the heated second mixture in an evaporator, with the formation of an air/$H_2O$-vapor/$NH_3$ mixture. In another additional or alternative embodiment of the invention, a regeneration unit for a 3-stage desorption process, in which the pollutant-loaded active coke is initially guided from the moving bed reactor of the vertically extended regeneration unit from above through an indirectly heated desorber, such as a tubular desorber, and subsequently is conducted from above through a post-degassing zone, with the suctioning-off of desorbed polluting gas, and finally, from above, through an indirectly cooled cooler. In another additional or alternative embodiment of the invention, there is provided a method and apparatus for cleaning waste gasses from a sintering process in accordance the method and apparatus illustrated in FIGS. 1-4.

BRIEF DESCRIPTION OF THE DRAWINGS

Reference may now be made to the drawings, which illustrate several non-limiting embodiments that the invention may take in physical form and in certain parts and arrangements of parts wherein.

NON-LIMITING EMBODIMENTS OF THE INVENTION

Figure 1A:
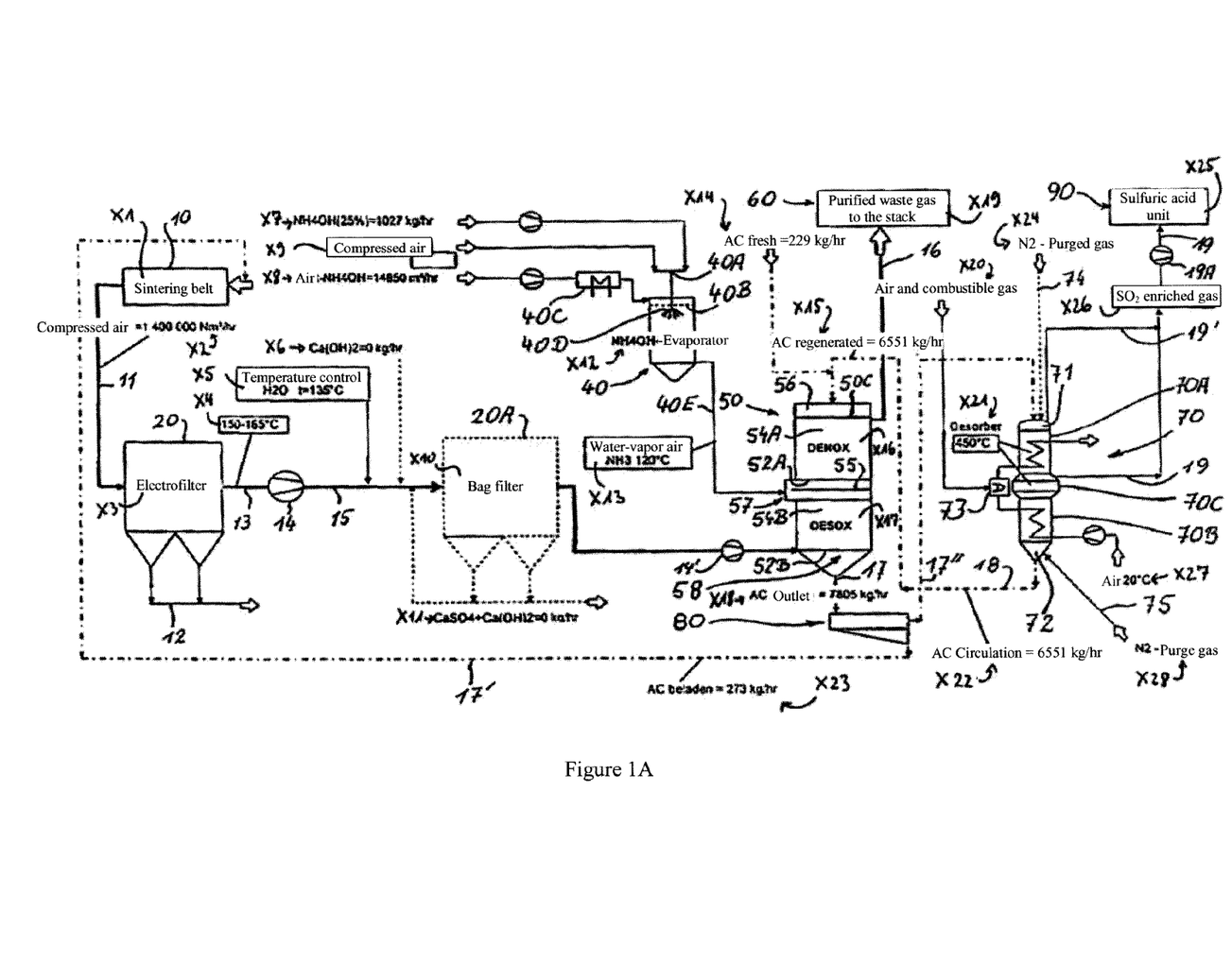
FIG. 1A is a schematic representation of the method (method flow chart) of a first embodiment example.

Referring now to the drawings wherein the showings are for the purpose of illustrating non-limiting embodiments of the invention only and not for the purpose of limiting same, FIG. 1A; illustrates the waste gas yielded on a sintering belt 10 is conducted via a tubular conduit 11 to an electrofilter 20, which is, in fact, known. The dust yielded thereby is conducted back to the sintering belt via a tubular conduit 12. The waste gas flowing away from the electrofilter at approximately 150° C. to 165° C. is conducted to a subsequently inserted blower 14 via a tubular conduit 13. This provides for a sufficient increase in pressure for the operation of the unit. The sintering waste gas exiting through the tubular conduit 15 is initially cooled to approximately 135° C. with water, by evaporation and, via a gas blower 14', is conducted to a moving bed reactor 50, working in a counterflow, in the gas inflow bulk material removal tray 52B there. The purified gas exiting via the tubular conduit 16 can be conducted directly to the waste gas stack 60 and released to the atmosphere. The electrofilter 20 can be supplemented or replaced by a bag filter 20A if desired.

The bulk material layers 54A/B set up in the moving bed reactor unit 50 consist, for example, of active coke particles. Dust residues that have also passed through the electrofilter 20 and/or the bag filter 20A, including mercury and other heavy metals and perhaps of other pollutants such as organic compounds, in particular, heavy hydrocarbons, dioxins, and furans, among others, are directly deposited in the inflow area—that is, in the area of a lower inflow tray 52B and perhaps a particle layer directly above—adsorptively, absorptively, or adhesively. From the lower adsorption/absorption agent layer 54B, the sintering waste gas is expelled from the reactor 50 at a side deflection site 57, and mixed thoroughly and intensively with $NH_3$ in a longitudinal slit. Subsequently, the sintering waste gas arrives at the reactor 50 below an inflow/removal tray 52A and above back into the upper adsorption/absorption agent layer 54A for removal of nitrogen. The adsorption/absorption agent migrates, via the storage bin 56, as will be explained below with regard to FIGS. 2 and 3, one after the other through both adsorption agent layers 54A/B downward to the exit. In the upper absorption agent layer 54A, the sintering waste gas essentially still contains only $NO_x$, dioxins/furans or any other pollutants such as PCBs and/or PAKs, which are then bound to the fresh or regenerated adsorption or absorption agent coming from above. Under the catalytic effect of the active coke from $NO_x$ and $NH_3$, essentially water vapor and nitrogen are formed. The $NH_3$ is produced in a unit 40 into which $NH_4OH$ is sprayed, mixed with compressed air. The $NH_3$-addition unit 40, which has independent inventive importance, preferably works in the following manner:

A 25% $NH_4OH$ solution and compressed air are mixed at 40A. The mixture arrives via a tube at the interior of the evaporator below a nozzle tray 40B, such as a perforated tray. The nozzle tray 40B, located within the evaporator, is impinged-on on its upper side by an air-$NH_4OH$ mixture; the mixture is uniformly distributed in the interior of the evaporator via the nozzle tray. This mixture was sufficiently heated beforehand by means of a heat exchanger 40C. The nonheated mixture of $NH_4OH$ and compressed air supplied by the mixing site 40A of a nebulization nozzle 40D below the nozzle tray 40B is evaporated by the heated air-$NH_4OH$ mixture, which prevails on the nozzle tray 40B so that on the lower evaporator end, an air/$H_2O$-vapor/$NH_3$ mixture enters a feed conduit 40E at approximately 120° C., which provides the deflection site 57 of the moving bed reactor 50 and the sintering waste gas deflected there with the aforementioned mixture.

Via the tubular conduit 17, the consumed active coke is conducted to a screening device 80, from which the screened-off fine material (undersized material) is conducted to the sintering belt via the tubular conduit 17' for burning, so as to be used as the fuel in the sintering process, whereas the yielded coarse material is conducted to a regeneration stage 70, which is in fact known, via the tubular conduit 17", so that this undersized material does not return to the moving bed reactor 50. The regeneration 70 consists of a multistage reactor, which is traversed from above downwards by the loaded active coke. In an upper pre-degassing stage 70A, the active coke is heated to approximately 450° C. In a middle post-degassing stage 70C accumulating $SO_2$, enriched gas is removed and conducted to a disposal unit via a tubular conduit 19—for example, to a sulfuric acid production unit 90 in which after the cooling stage 70B that follows below, only small quantities of pollutants are still released. From the regeneration unit 70, the regenerated adsorption/absorption agent is conducted via the tubular conduit 18 once again to the storage bin 56 of the moving bed reactor 50. The regeneration unit 70, which has independent inventive importance, works in detail as follows:

Consumed active coke from the moving bed reactor 50 arrives via the screening device 80 and the tubular conduit 17" at a storage bin 71 lying above. The regeneration stage 70A lying below is designed as the tubular desorber—that is, at the bottom of the storage bin 71, a large number of vertical pipes move downwards, through which the active coke can migrate, while these pipes are heated on their outside with hot combustion air of approximately 450° C. At the lower end of the regeneration stage 70A, these tubes discharge through a lower tray in a cross-section-enlarged chamber (regeneration stage 70C), which as a post-degassing zone, holds the active coke at approximately 450° C. over a residence time of approximately 1 h to 2 h. The active coke, which gradually migrates through all regeneration stages from above downwards, arrives at the lower end of the post-degassing zone once again in a tubular reactor (regeneration stage 70B), which, in its mode of construction, essentially corresponds to the tubular desorber of the regeneration stage 70A. Here, the active coke is cooled indirectly, wherein, as the cooling gas, air at room temperature is used on the outside of the cooling tube. At the lower end of the regeneration stage 70B, the tubes conducting the active coke discharge, once again, freely into a tray. From there, the active coke goes into the discharge bin 72 lying beneath. Without contact with the active coke, the compressed air introduced at 20° C. at the lower end of the regeneration stage 70B is conducted to below the regeneration stage 70C. From there, a tubular conduit leads the air, preheated in the cooling stage, to a heater 73, which is fed with air and combustible gas. The hot combustion gas/air mixture then arrives—without direct contact with the active coke—at the lower end of the regeneration stage 70A, at whose upper end the air which still has a temperature of approximately 450° C. once again leaves the regeneration unit 70.

The pollutants that arrive at the heating stage 70A with the loaded active coke desorb under the given temperature conditions and the indirect heating, and can leave the regeneration unit 70 both in the area of the post-degassing zone 70C via tubular conduit 19, and also via the storage bin 71 and conduit 19' as $SO_2$-enriched gas, wherein a suction blower 19A produces the required reduced pressure, and conducts further the $SO_2$-enriched gas, for example, to a sulfuric acid production unit 90 which is in fact, known, for further workup. The desorption gas, ascending toward the tubular conduit 19', promotes the heat transfer to the active coke within the desorption tube, heated on the outside, in the upper regeneration stage 70A. It is, however, also possible—and depicted as an alternative in the drawing with a tubular conduit 74 as a broken line—to deliver nitrogen-containing purge gas to the storage bin 71, and to conduct this purge gas through the desorption tube into the post-degassing zone 70C, and from there, to the sulfuric acid unit 90. In order to also expel pollutant-containing gases from the active coke in the cooling stage 70B, and also to promote the heat transfer in this cooling stage, the discharge bin 72 is impinged-on with nitrogen-containing purge gas via a tubular conduit 75, which is once again removed from the regeneration unit 70 via the post-degassing zone 70C.

A typical waste gas composition before and after the waste gas purification is depicted in the table:

|  | Raw gas | Pure gas |  |
| --- | --- | --- | --- |
| Dioxin | 3 to 10 | 0.1 to 0.5 | $ng/m^3$ |
| $SO_2$ | 700 | <50 | $mg/m^3$ |
| HCl | 50 | <5 | $mg/m^3$ |
| NOx | 350 | <100 | $mg/m^3$ |

First Embodiment Example

In a first practical embodiment example, the operating conditions indicated in FIG. 1A are produced (without using a bag filter).

Second Embodiment Example

Figure 1B:
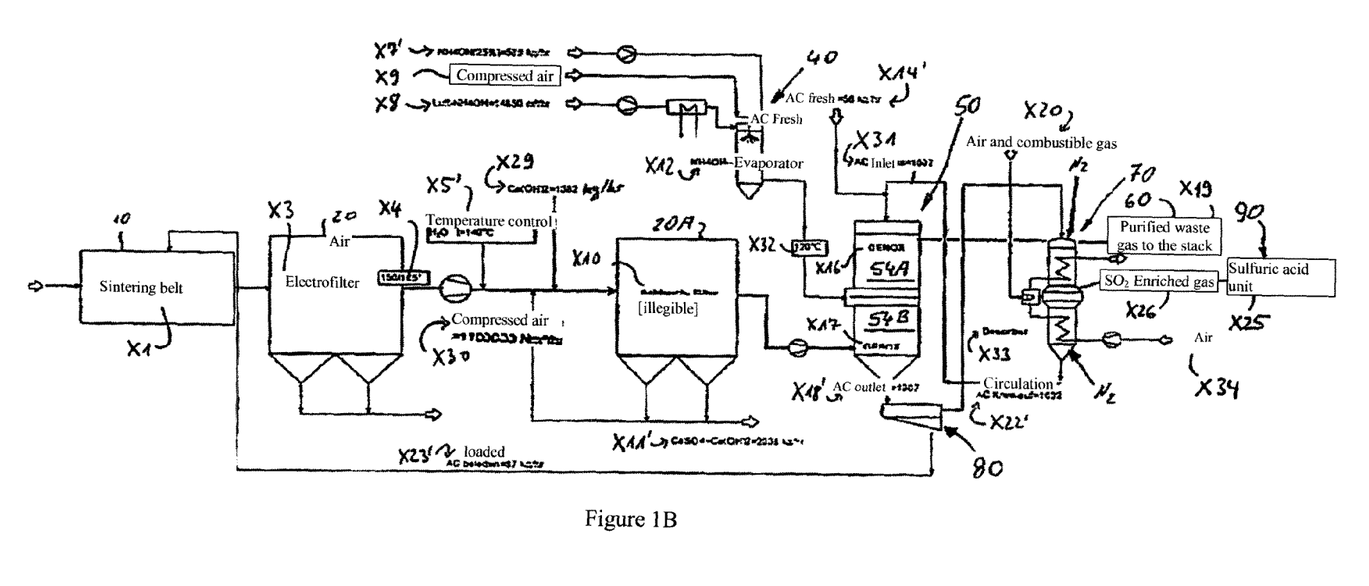
FIG. 1B is a schematic representation of the method (method flow chart) of a second embodiment example.

In a second practical embodiment example, the operating conditions indicated in FIG. 1B are produced—when using a bag filter, but otherwise with the same setup as in FIG. 1A.

In the embodiment according to FIG. 1B, among other things, the active coke consumption, the active coke quantity to be regenerated, and the $H_2SO_4$ quantity to be produced are clearly lower than those in the embodiment example according to FIG. 1A.

Figure 2:
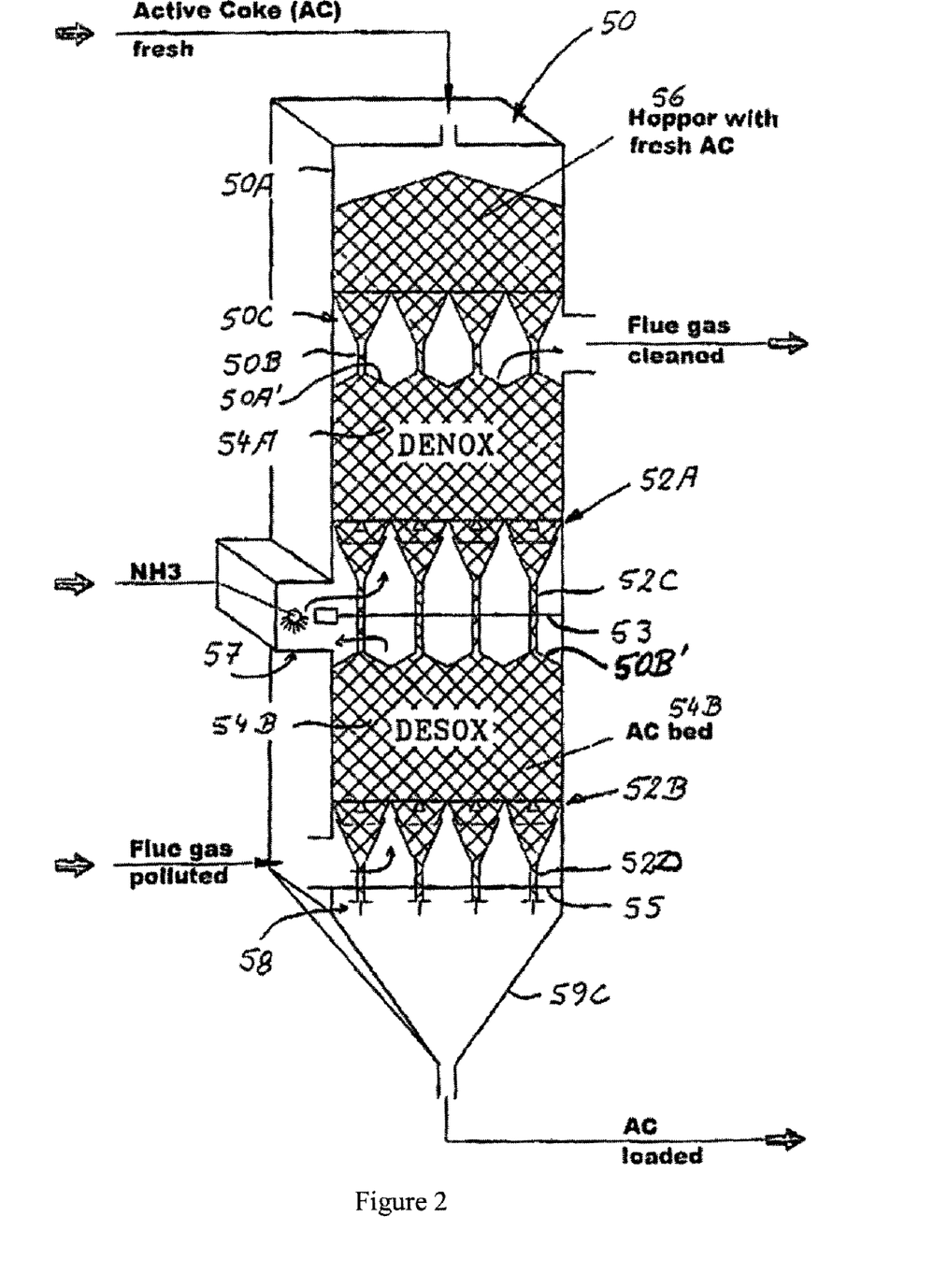
FIG. 2 is an individual reactor module, schematized in a perspective vertical section.

As can be seen in FIG. 2, a moving bed reactor 50, in accordance with the invention, consists, in its simplest form, of a container 50A, which has a rectangular outline and is replenished with active coke at its upper end, which upper end is in a storage bin 56, lying above. From there, the active coke is supplied to an upper active coke layer 54A, via a bulk material distribution tray 50C, via bulk material-allotting tubes 50B, arranged in the form of a grid. This is done without blocking elements, so that a pure gravity filling is available, which is automatically ended when the surface 50A' of the upper active coke layer reaches the discharge ends of the bulk material-allotting tubes 50B. Between the bulk material-allotting tubes, a gas-removal space is formed in a manner which is, in fact, known. At the lower end of the upper active coke layer 54A, there is an upper gas inflow and bulk material removal tray 52A in a mode of construction that is, in fact, known, for example from WO 88/08746A1. Bulk material migrates downwards through this upper tray 52A and the sintering waste gas flows upwards. The bulk material removal tubes 52C, which follow the bulk material removal funnels arranged in the form of a grid, penetrate an intermediate tray 53 and discharge freely, at the upper surface of the active coke layer 54B found underneath. Here too, blocking elements for the active coke are not provided. At the lower end of the lower active coke layer 54B, there is a lower gas inflow and bulk material removal tray 52B with approximately the same configuration as tray 52A. The bulk material removal tubes 52D, which follow downwards in the form of a grid, penetrate an intermediate tray 55, below which the single bulk material removal elements of a discharge device 58 of the total module are located. Such removal elements are known from, among others, WO 90/14156A1. The loaded active coke is removed at the lower reactor end.

The sintering waste gas to be purified is discharged at a deflection site 57 at the border of the intermediate tray 55; is thoroughly and intimately mixed with $NH_3$, and enters, once again, the upper bulk material layer 54A of the moving bed reactor 50 under the gas inflow/bulk material removal tray 52B.

Figure 3:
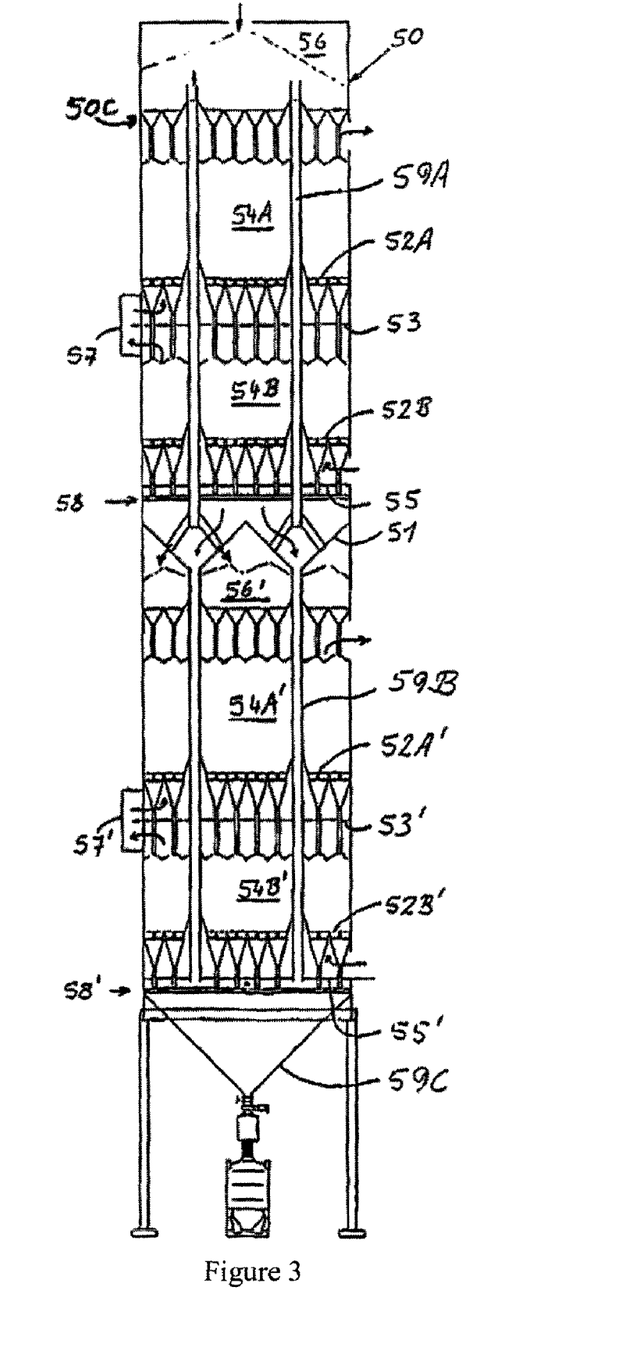
FIG. 3 is two reactor modules, arranged one over the other, as a section from a larger sintering waste gas purification unit.

As can be seen from FIG. 3, a moving bed reactor 50 can also be constructed with two levels. It then essentially consists of two modules, arranged one above the other, with the configuration shown in FIG. 2. In FIG. 3, a "'" is added to the reference symbols for the lower module. In order to make possible a simple transport of the adsorption/absorption agent, arranged above storage bin 56 are bulk material-conducting tubes 59A, which completely permeate the upper of the two moving bed reactor modules and are distributed onto a lower storage bin 56' in the shape of a Y, below the discharge device 58, wherein an intermediate tray 51 provides for a complete separation of the fresh adsorption/absorption agent, flowing to the lower storage bin 56', from the loaded adsorption/absorption agent, discharged at the discharge device 58. This loaded adsorption/absorption agent of the upper reactor module is conducted completely through the lower reactor module, via the bulk material-conducting tubes 59B and thus arrives at a removal funnel 59C, through which the loaded adsorption/absorption agent of the two reaction modules is expelled from the moving bed reactor 50.

Figure 4:
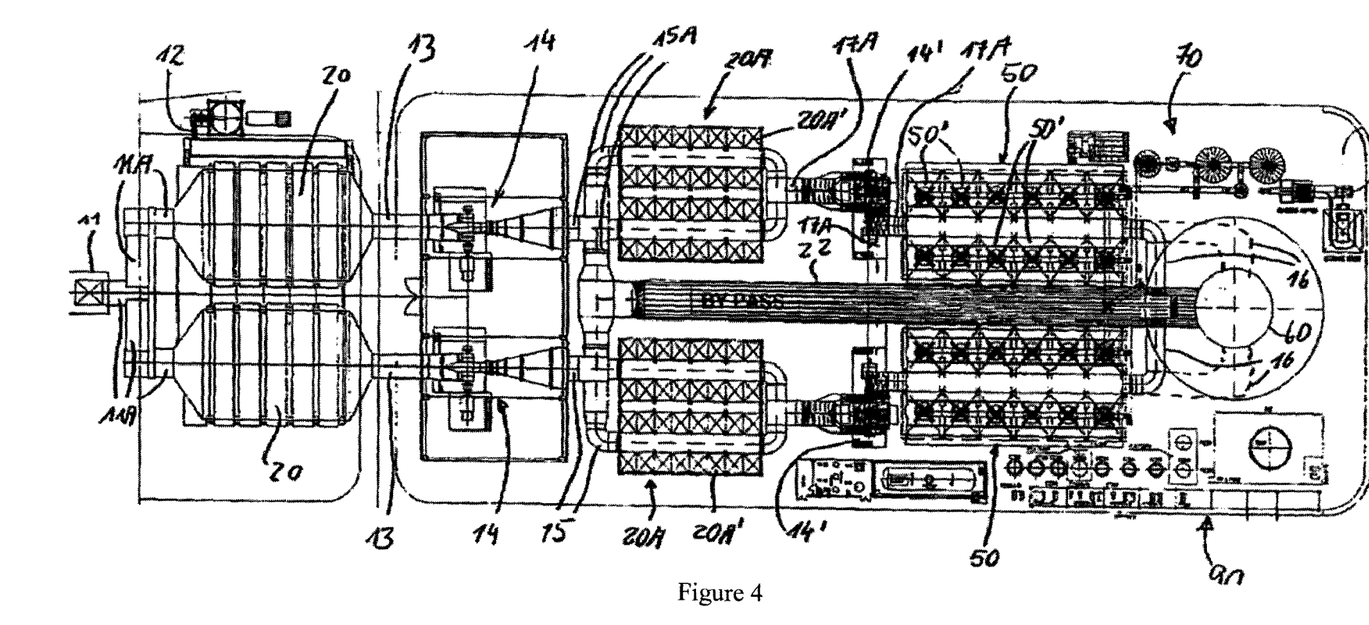
FIG. 4 is a representation of an apparatus for purifying flue gasses that includes the systems identified in FIG. 1.

A practical unit example according to FIG. 4 shows the general conducting of the process, according to FIG. 1A, wherein similar parts are designated the same way. In contrast to FIG. 1A, the unit for the purification of the sintering belt waste gas is double-strand;

the electrofilters 20 have several fields—here with 5, wherein in the combination under consideration, 2 or 3 fields are inserted before the bag filters with many chambers 20A'—here in 4 parallel-inserted bag filter chambers 20A', with several filter bags each;

the bag filters are provided with many chambers 20A'—here in 4 parallel-inserted bag filter chambers 20A' with several filter bags each;

after the blowers 14, the bag filters 20A and the moving bed reactors 50 can be passed through a conduit 22 to the stack 60, in order to avoid disturbances or damage in special cases;

additional blowers 14, producing the required excess pressure to overcome the pressure loss in the subsequent moving bed reactor modules 50', of which one is shown in FIG. 2, and which also can be constructed at several levels.

For cooling of the waste gas to the desired operating temperature in the waste gas purification unit, room air can be mixed in and/or water can be sprayed in for the evaporative cooling. The mixing-in and/or spraying-in site can be located before the electrofilter(s) and/or the bag filters. Under special operating conditions of the sintering belt, wherein pollutants appear, or appear increasingly, and can also be sticky, particle-shaped material—as is known—can be added to the waste gas flow to trap the pollutants. This can occur before the electrofilter, before the bag filter, and/or the moving bed reactor (filter), whereby the material is circulated or conducted through one time.

With the sintering belt waste gas purification unit, provided here for very large gas volume flows, an improved flexibility is attained by a variable gas division to one and/or more components of the electrofilters, the bag filters, and/or joined moving bed reactor modules (tubes 11A, 15A, 17A, and perhaps, blocking elements).

The features of the figures can be used, in the sense of the invention, individually or in combination with one another—both within the framework of the individual embodiment example and also with various examples, among one another.

REFERENCE SYMBOL LIST

| Reference symbol list: | |
|---|---|
| 10 | Sintering belt |
| 11 | Tubular conduit |
| 12 | Tubular conduit |
| 13 | Tubular conduit |
| 14 | Blower |
| 15 | Tubular conduit |
| 16 | Tubular conduit |
| 17 | Tubular conduit |
| 17' | Tubular conduit |
| 17" | Tubular conduit |
| 18 | Tubular conduit |
| 19 | Tubular conduit |
| 19' | Tubular conduit |
| 19A | Blower |
| 20 | Electrofilter |
| 20A | Bag filter |
| 40 | $NH_3$-addition unit |
| 40A | Mixing site |
| 40B | Nozzle tray |
| 40C | Heat exchanger |
| 40D | Nebulization nozzle |
| 40E | Feed conduit |
| 50 | Moving bed reactor |
| 50A | Container |
| 50A' | Surface |
| 50B | Bulk material-allotting tube |
| 50B' | Surface |
| 50C | Bulk material-distributing tray |
| 50C' | Bulk material-distributing tray |
| 51 | Intermediate tray |
| 52A, 52A' | Upper inflow/removal tray |
| 52B, 52B' | Lower inflow/removal tray |
| 52C | Bulk material removal tube |
| 52D | Bulk material removal tube |
| 53, 53' | Intermediate tray |
| 54A, 54A' | Upper bulk material layer |
| 54B, 54B' | Lower bulk material layer |
| 55, 55' | Intermediate tray |
| 56 | Storage bin |
| 56' | Lower storage bin |
| 57, 57' | Deflection site |
| 58, 58' | Discharge elements |
| 59A/B | Bulk material-conducting tube |
| 59C | Removal funnel |
| 60 | Stack |
| 70 | Regeneration unit |
| 70A, B, C | Regeneration stages |
| 71 | Storage bin |
| 72 | Discharge bin |

| -continued | |
|---|---|
| Reference symbol list: | |
| 73 | Heater |
| 74 | Tubular conduit |
| 75 | Tubular conduit |
| 80 | Screening device |
| 90 | Sulfuric acid production unit |

The invention claimed is:

1. A method for purification of waste gas of an at least partially burnt solid fuel, said waste gas containing one or more gasses selected from the group consisting of $CO_2$, CO, $O_2$, $H_2O$, and/or $N_2$, and one or more pollutants selected the group consisting of $NO_x$, $SO_x$, HCl, HS, Hg, dioxins, furans, dusts, sublimatable residues, condensable residues, heavy hydrocarbons, and heavy metals, characterized in that:

said waste gas flows into a moving bed reactor from below through a lower horizontal gas inflow and a bulk material removal tray of said moving bed reactor, into a lower layer of adsorption and/or absorption agent already polluted with $NO_x$ and $SO_x$ and/or other pollutants, and with a throughflow of said lower adsorption agent and/or absorption agent layer, adsorbs at least a main quantity of $SO_x$ from said waste gas in a pore system of said adsorption and/or absorption agent, loaded with $NO_x$ and/or $N_2$;

said waste gas, purified of said main quantity of $SO_x$ leaves said lower adsorption and/or absorption agent layer on its upper free surface, so as to be intimately mixed subsequently for conversion of said NOx, with an ammonium-containing compound;

said waste gas, mixed with said ammonium-containing compound and purified of said main quantity of $SO_x$, enters from below through an upper horizontal gas inflow and said bulk material removal tray of said moving bed reactor, an upper layer of said adsorption and/or absorption agent already polluted with $NO_x$ and/or $N_2$, with a throughflow of said upper adsorption and/or absorption agent layer, adsorbs at least a main quantity of $NO_x$ components from said waste gas and/or their reaction products, on a surface of said and/or absorption agent, loaded with $NO_x$ and/or $N_2$;

said waste gas, purified of said main quantity of $SO_x$ leaves said upper adsorption and/or absorption agent layer on its upper free surface, so as to subsequently leave said process;

fresh and/or regenerated adsorption and/or absorption agent is supplied to said upper free surface of said upper layer of said adsorption and/or absorption agent, uniformly distributed from above via a bulk material-distributing tray, on said upper end of said moving bed reactor and without interruption by blocking elements in an area of said upper gas inflow and said bulk material removal tray, subsequently migrates completely through said upper and lower layers of said entire moving bed reactor, gradually, from above downwards, and thereby successively, is initially loaded with $NO_x$ or $N_2$ and water vapor on its surface, and subsequently with $SO_x$ in its pore system, and subsequently migrates through a lower gas inflow and said bulk material removal tray of said moving bed reactor;

said subsequent conducting, removal, and said migration rate of said adsorption agent and/or said absorption agent takes place via bulk material discharge elements, below or on said lower gas inflow and said bulk material removal tray; and, a loading quantity of said adsorption and/or absorption agent in said upper layer of said moving bed reactor with $SO_x$ is adjusted to a pre-specifiable quantity fraction, relative to said loaded adsorption and/or absorption agent, by a corresponding actuation of said bulk material discharge elements, below or on said lower gas inflow and said bulk material removal tray.

2. The method as defined in claim 1, wherein a loading value of said adsorption and/or absorption agent of said moving bed reactor in said upper layer with $SO_x$ is limited to a maximum 10 wt % relative to a weight of said adsorption and/or absorption agent, removed on said bulk material discharge elements.

3. The method as defined in claim 1, wherein a carbon-containing adsorption and/or absorption agent is used as said adsorption and/or absorption agent.

4. The method as defined in claim 3, wherein said carbon-containing adsorption and/or absorption agent is an active coke.

5. The method as defined in claim 3, wherein said carbon-containing adsorption and/or absorption agent has a particle size of predominantly 1 mm to 10 mm.

6. The method as defined in claim 3, wherein said consumed or partially consumed adsorption and/or absorption agent, removed below from said moving bed reactor, is extensively freed in a regeneration step, from said adsorbed and/or absorbed pollutants and at least partially is delivered once again above to said moving bed reactor as said adsorption and/or absorption agent alone or mixed with said freshly used, carbon-containing adsorption and/or absorption agent.

7. The method as defined in claim 6, wherein said regeneration step takes place in a 3-stage process in which said nitrogen-loaded active coke is initially guided from said moving bed reactor in a vertically extended regeneration unit, from above, through an indirectly heated desorber and subsequently is conducted from above, through a post-degassing zone, with suctioning of desorbed polluting gas, and finally, from above, through an indirectly cooled cooler.

8. The method as defined in claim 3, wherein as said freshly used, carbon-containing adsorption and/or absorption agent, a preactivator is used.

9. The method as defined in claim 3, wherein said gas purification takes place on said adsorption and/or absorption agent, at temperatures above 80° C.

10. The method as defined in claim 3, wherein said upper layer of said adsorption and/or absorption agent has, in the moving bed reactor, a height between 1.5 m and 4.5 m.

11. The method as defined in claim 3, wherein said lower layer of said adsorption and/or absorption agent has, in said moving bed reactor, a height between 0.5 m and 3 m.

12. The method as defined in claim 1, wherein an ammonium-containing compound is produced, for said $NO_x$ conversion and adsorption on a bulk material, from a mixture of an ammonium-containing solution and compressed air, said mixture of which is atomized into an evaporator, with an air/$H_2O$-vapor/$NH_3$ gas mixture, with an admixture of a another heated mixture of an ammonium-containing solution and air.

13. The method as defined in claim 1, wherein a substance selected from the group consisting of calcium oxide, calcium hydroxide, sodium bicarbonate, alkali-earth compound, and alkaline-earth compound for binding of a partial quantity of said $SO_x$, HS, and/or HCl is added to said waste gas in a preliminary purification step.

14. The method as defined in claim 13, wherein said added quantity corresponds to a stoichiometry factor between 1.0 and 2.5.

15. The method as defined in claim 13, wherein a partial quantity of the $SO_x$, and/or HCl is removed in a preliminary purification stage corresponds to a fraction between 10 and 90% of said $SO_x$, HS, and/or HCl contained in said waste gas.

16. The method as defined in claim 1, wherein a partial quantity of the $SO_x$, and/or HCl is removed in a preliminary purification stage corresponds to a fraction between 10 and 90% of said $SO_x$, and/or HCl contained in said waste gas.

17. An apparatus for the purification of waste gas of an at least partially burnt solid fuel, wherein said waste gas contains one or more gasses selected from the group consisting of $CO_2$, CO, $O_2$, $H_2O$ and $N_2$, and one or more pollutants selected from the group consisting of $NO_x$, $SO_x$, HCl, Hg, dioxins, furans, dusts, and sublimatable residues, condensable residues, heavy hydrocarbons, and heavy metals; characterized by:

a moving bed reactor, tilled with a lower and an upper adsorption agent and/or absorption agent layer, with a lower horizontal gas inflow and a bulk material removal tray, through which said waste gas can flow from below into a lower layer of said adsorption and/or absorption agent already polluted with $NO_x$, and/or $N_2$, and $SO_x$;

a mixing element, subsequently inserted on an upper free surface of said lower adsorption and/or absorption agent layer, for intimate mixing of said waste gas, purified of a main quantity of $SO_x$, with an ammonium-containing compound;

an upper, horizontal gas inflow and said bulk material removal tray of said moving bed reactor, without blocking elements in an area of upper gas inflow and said hulk material removal tray, through which said waste gas, mixed with said ammonium-containing compound and purified of said main quantity of $SO_x$ can flow from below, into said upper layer of said adsorption and/or absorption agent already polluted with $NO_x$ or $N_2$ and small quantities of $SO_x$;

an upper free surface of said upper adsorption and/or absorption agent layer from which said waste gas, purified of said main quantity of $SO_x$ and $NO_x$ components, can leave said adsorption and/or absorption layer, so as to subsequently leave said moving bed reactor;

a bulk material-distributing tray on said upper end of said moving bed reactor that can be supplied by fresh and/or regenerated adsorption and/or absorption agent, via said upper free surface of said upper layer of said adsorption agent and/or absorption agent, from above;

bulk material discharge elements, on or below said lower gas inflow and said bulk material removal tray, taking place by subsequent conducting, removal, and migration rate of said adsorption and/or absorption agent; and, control means of said bulk material discharge elements, by means of which a loading quantity of said adsorption and/or absorption agent in said upper layer of said moving bed reactor can be adjusted with $SO_x$ to a pre-specifiable quantity fraction, relative to said loaded adsorption and/or absorption agent, by corresponding actuation of said bulk material discharge elements, below or on said lower gas inflow and said bulk material removal tray.

18. The apparatus as defined in claim 17, wherein said mixing element for said intimate mixing of said waste gas, purified of said main quantity of $SO_x$, with said ammonium-containing compound comprises a slit nozzle, which extends approximately horizontal over at least one wall side of said moving bed reactor.

19. The apparatus as defined in claim 17, wherein an $NH_3$ addition unit, with which ammonium-containing compound for the $NO_x$ conversion and adsorption on a bulk material is produced, with a mixing site for an ammonium-containing solution, a heat exchanger for heating of another mixture of an ammonium-containing solution and air, and with a nebulization nozzle for admixing of a first mixture to a heated second mixture in an evaporator, with formation of an air/$H_2O$-vapor/$NH_3$ mixture.

20. The apparatus as defined in claim 17, wherein a regeneration unit for a 3-stage desorption process, in which pollutant-loaded active coke is initially guided from said moving bed reactor of a vertically extended regeneration unit from above through an indirectly heated desorber, and subsequently is conducted from above through a post-degassing zone, with suctioning-off of desorbed polluting gas, and finally, from above, through an indirectly cooled cooler.

21. A method for the purification of waste gas that contains one or more gasses selected from the group consisting of $CO_2$, $CO$, $O_2$, $H_2O$ and $N_2$, and one or more pollutants selected from the group consisting of $NO_x$, $SO_x$, HCl, HS, Hg, dioxins, furans, dusts, sublimatable residues and condensable residues, heavy hydrocarbons, and heavy metals, said method including the steps of:
   a. flowing said waste gas into a moving bed reactor from below through a lower horizontal gas inflow and bulk material removal tray of the moving bed reactor, into a lower layer of adsorption and/or absorption agent already polluted with $NO_x$ and $SO_x$ and/or other pollutants, and with a throughflow of a lower adsorption agent and/or absorption agent layer, adsorbs at least a main quantity of $SO_x$ from said waste gas in a pore system of said adsorption an/or absorption agent, loaded with $NO_x$ and/or $N_2$;
   b. removing said waste gas from said lower adsorption and/or absorption agent layer on its upper free surface so as to be intimately mixed subsequently for conversion of said $NO_x$ with ammonium-containing compound;
   c. flowing said waste gas that is mixed with said ammonium-containing compound and purified of said main quantity of $SO_x$ from below through an upper horizontal gas inflow and a bulk material removal tray of said moving bed reactor, an upper layer of said adsorption and/or absorption agent already polluted with $NO_x$, $N_2$ and/or $SO_x$ with throughflow of said upper adsorption and/or absorption agent layer, adsorbs at least a main quantity of $NO_x$ components from said waste gas and/or their reaction products, on a surface of said adsorption and/or absorption agent, loaded with $NO_x$ $N_2$ and/or $SO_x$;
   d. removing said waste gas that is purified of said main quantity of $SO_x$ and $NO_x$ components from said upper adsorption and/or absorption agent layer on its upper free surface, so as to subsequently leave said process;
   e. supplying fresh and/or regenerated adsorption and/or absorption agent to said upper free surface of said upper layer of said adsorption and/or absorption agent, via a bulk material-distributing tray, on the upper end of said moving bed reactor and without interruption by blocking elements in an area of upper gas inflow and said bulk material removal tray, subsequently migrates completely through said upper and lower layers of said entire moving bed reactor, gradually, from above downwards, and thereby successively, is initially loaded with $NO_x$ or $N_2$ and water vapor on its surface, and subsequently with $SO_x$ in its pore system, and subsequently migrates through a lower gas inflow and said bulk material removal tray of said moving bed reactor, a subsequent conducting, removal, and migration rate of said adsorption agent and/or said absorption agent takes place via bulk material discharge elements, below or on said lower gas inflow and said bulk material removal tray; and,
   f. loading a quantity of said adsorption and/or absorption agent in said upper layer of said moving bed reactor with $SO_x$ is adjusted to a pre-specifiable quantity fraction, relative to said loaded adsorption and/or absorption agent, by corresponding actuation of said bulk material discharge elements, below or on said lower gas and said bulk material removal tray.

* * * * *